(12) United States Patent
Christensen et al.

(10) Patent No.: US 6,708,950 B2
(45) Date of Patent: Mar. 23, 2004

(54) BITE VALVE

(75) Inventors: Mark A. Christensen, Salt Lake City, UT (US); Marshall T. Denton, Salt Lake City, UT (US)

(73) Assignee: Wolfe Tory Medical, Salt Lake City, UT (US)

( * ) Notice: Subject to any disclaimer, the term of this patent is extended or adjusted under 35 U.S.C. 154(b) by 42 days.

(21) Appl. No.: 10/099,304

(22) Filed: Mar. 15, 2002

(65) Prior Publication Data

US 2003/0173536 A1 Sep. 18, 2003

(51) Int. Cl.[7] ............................................. F16K 31/00
(52) U.S. Cl. .................. 251/342; 220/714; 239/533.13; 224/148.2
(58) Field of Search ......................... 222/175; 220/714; 224/148.2; 251/341, 342, 343, 344; 239/533.13

(56) References Cited

U.S. PATENT DOCUMENTS

| 2,219,604 A |   | 10/1940 | Trotter |
|---|---|---|---|
| 2,755,060 A | * | 7/1956 | Twyman ............... 251/342 |
| 2,989,961 A |   | 6/1961 | Blanchett |
| 3,822,720 A |   | 7/1974 | Souza |
| 3,965,925 A |   | 6/1976 | Gooch |
| 4,176,683 A |   | 12/1979 | Leibinsohn |
| 4,690,375 A |   | 9/1987 | Vorhis |
| 4,850,566 A |   | 7/1989 | Riggert |
| 4,968,294 A |   | 11/1990 | Salama |
| 5,104,016 A |   | 4/1992 | Runkel |
| 5,215,231 A |   | 6/1993 | Paczonay |
| 5,645,404 A |   | 7/1997 | Zelenak |
| 5,911,406 A | * | 6/1999 | Winefordner et al. ...... 251/339 |
| 5,971,357 A |   | 10/1999 | Denton et al. |
| 6,039,305 A |   | 3/2000 | Hoskins et al. |

* cited by examiner

Primary Examiner—Edward K. Look
Assistant Examiner—John K Fristoe, Jr.
(74) Attorney, Agent, or Firm—TraskBritt

(57) ABSTRACT

An improved bite valve for use in personal hydration devices and other water dispensing systems. The valve has a flexible conduit sealed at an end by a cap. Fluid is blocked from flowing out of the conduit by the cap. The cap provides a fluid seal as a ring around an exterior surface of the conduit. Biting an end of the conduit, near the cap, radially separates the conduit from the cap, permitting fluid to flow into a person's mouth. The configuration of the valve permits a larger valve opening, and correspondingly improved fluid flow through the valve. A positive stop mechanism, to prevent undesired fluid flow, may also be provided in a valve.

25 Claims, 4 Drawing Sheets

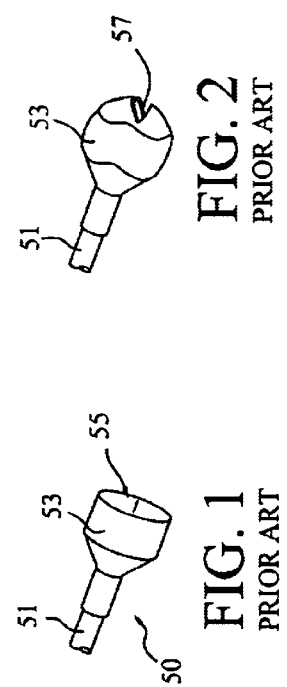
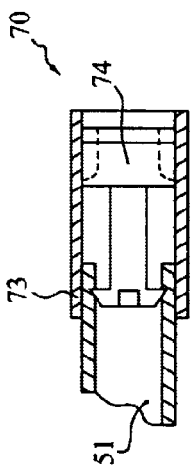
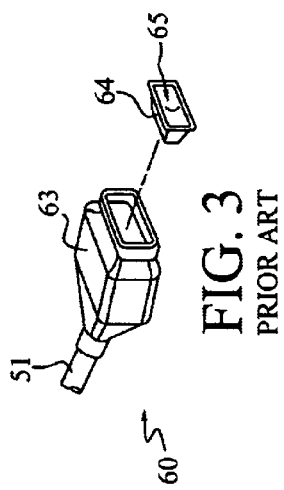
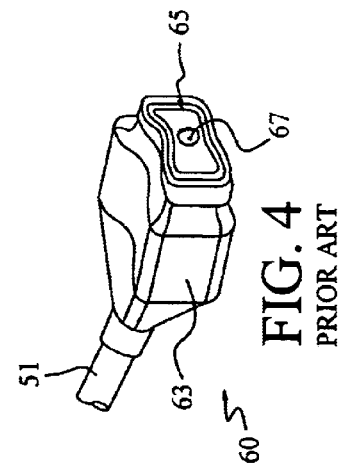
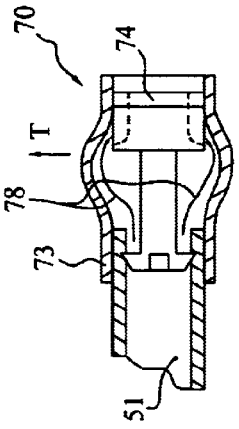
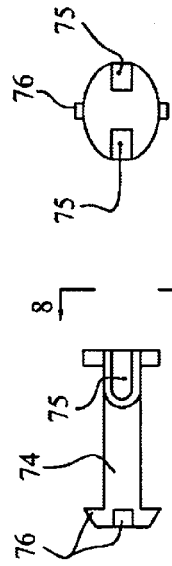
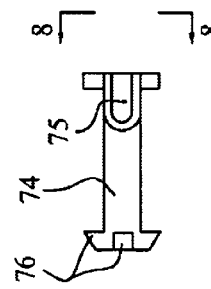

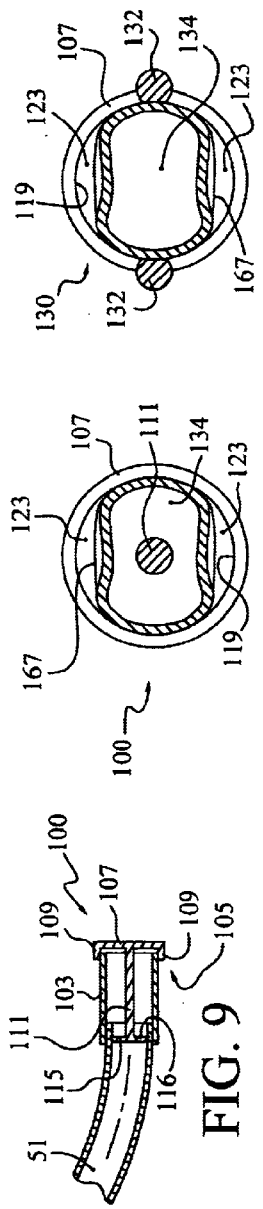

BITE VALVE

TECHNICAL FIELD

The invention relates generally to valves operable to dispense fluids, and particularly to fluid dispensing valves (e.g., "bite valves") having an orifice opened by an applied transverse displacement to a valve body, such as may occur by biting them in a human mouth.

BACKGROUND

Fluid dispensing valves are known, including certain valves commonly used in commercially available personal hydration systems. Such personal hydration systems typically incorporate a bite valve disposed at the end of an elongated conduit attached to a fluid source. The fluid source may therefore be stored in a backpack, or other remote carrying device, with the bite valve being in a convenient proximity to a mouth for dispensing a quantity of fluid, as desired.

A "bite valve" is named for the technique commonly used to permit fluids to flow through the valve. A person simply bites the valve body transversely to squeeze the body sides together. As the body is squeezed between a user's teeth, a fluid flow path is opened, and fluid may flow through the valve.

A first type of bite valve is used in a range of products sold by the CamelBak™ Company. A second type of bite valve is used in a variety of personal hydration products sold under the Platypus name by Cascade Designs™. The CamelBak™, valve and Platypus valve are similar in that each has a vertical slit disposed at the distal end of a soft valve body. Biting the body causes the slit to open, permitting a flow of fluid through the bite-formed opening in the slit.

A third type of bite valve is disclosed in U.S. Pat. No. 5,971,357, issued to Denton et al. on Oct. 26, 1999, and assigned to Wolfe Tory Medical, Inc. The disclosure of U.S. Pat. No. 5,971,357 is hereby incorporated as part of this disclosure as though set forth herein in its entirety. The Wolfe Tory valve has a stiff inner core member disposed inside a soft conduit sealing member. Biting the soft conduit opens a fluid flow path through the core member.

All three types of bite valves described above suffer from a requirement to orient the valve in a user's mouth for proper operation. In fact, the Platypus and CamelBak™, valves both have oblong cross-sections to assist in such orientation. Biting any of the prior-mentioned valves in a mis-oriented position can result in a failure to cause the opening mechanism to deform sufficiently to permit a flow of fluid through the valve orifice.

The three prior-mentioned valves also may suffer from the tendency to leak under certain conditions. A first leak promoting situation is when contents of the fluid reservoir are excessively pressurized. Each of the above described bite valves has a self-biased valve seal. Sometimes a fluid reservoir stored in a backpack is inadvertently pressurized by a person sitting on the backpack, or placing other objects on top of the backpack. Pressurized fluid acts on the self-biased valve seals in a direction to open the valves, and to permit fluid to escape. A second leak promoting situation is when the self-biased valve material loses resilience, causing the seal to be less effective. Resilience may be lost due to material hardening over time, or due to fatigue from use.

Furthermore, all three valves suffer from a relatively low throughput, or deliverable flow rate. It would be an advance to develop a bite valve capable of increased fluid throughput, and to overcome the other limitations described above.

SUMMARY OF THE INVENTION

The invention may be embodied as a valve operable to restrict fluid flow through a conduit. Such a valve includes a valve seal member having an inside perimeter surface oriented to circumscribe an opening of the valve, and through which opening a fluid path exiting the valve exists. A valve seal is formed at the valve opening between a flexible conduit having an exterior surface on a first end, and the seal member. The flexible conduit surface is adapted to form a self-biased engagement with the perimeter surface of the seal member to occlude and resist fluid flow through the opening. The valve may be opened to permit fluid flow by effecting a transverse displacement of a localized portion of the exterior surface of the flexible conduit relative to a corresponding engaged portion of the inside perimeter surface of the seal member.

Exemplary embodiments of the valve are sized to fit within a human mouth. A user's teeth can bite on the flexible conduit to effect the transverse displacement required to open the valve. Certain embodiments of the valve can be adapted to effect a transverse displacement of the flexible conduit independent of valve rotation, about a delivered fluid axis, in a mouth.

A valve may include a positive stop mechanism operable to resist fluid discharge through the valve opening. Examples of such positive stop mechanisms include "bayonet" locking mechanisms and sliding mechanisms in combination with structure to augment the valve seal. Certain sliding mechanisms can be adapted to bring an end of the flexible conduit into contact or plug fit engagement with an end seal.

Valves constructed according to the present invention are characterized by having a pressure augmented seal. That is, fluid pressure upstream of the valve opening actually increases the contact pressure between sealing surfaces, further resisting fluid flow through the valve.

Another way to describe the invention is as an improved bite valve to regulate fluid delivery to a human mouth. The valve provides an inside seal member having a first flexible portion configured in self-biased harmony with an outside seal member such that a localized transverse displacement, directed inwardly, of the first flexible portion opens a fluid flow path through an opening formed, as a result of separation of contact between the inside and outside seal members, by biting the valve. When a user bites the flexible portion, a fluid flow path is formed by a corresponding transversely inward deflection of the first flexible portion with respect to the outside seal member.

Sometimes the valve may be constructed with the outside seal member having a flexible portion to improve the feel of the device inside a user's mouth. In any event, the valve is typically attached, at a proximal end, to a fluid delivery conduit. An opposite end of the fluid delivery conduit typically extends to a remote fluid reservoir, although such is not a requirement. A fluid reservoir can be attached directly to a valve constructed according to the invention.

The invention may also be described as a valve having an inside seal member formed by a transversely flexible first conduit functioning to guide fluid from a first end toward a second end, and having a first seal surface located at an exterior perimeter of the second end. The conduit is arranged in harmony with an outside seal member to form a valve. The outside seal member is generally configured and arranged as a cap to block distally directed fluid flow exiting the second end of the first conduit. Preferred outside seal members will have a proximally directed flange forming a second conduit. The second conduit forms an inside surface carrying a second seal surface. The first seal surface on the first conduit is self-biased for engagement with the second seal surface to form a fluid seal to resist fluid flow through the valve. The valve is opened to permit fluid flow by effecting a radially inward displacement, of a localized portion of the first seal surface relative to a corresponding portion of the second seal surface.

The valve includes a support member adapted to locate the outside seal member in a functional position relative to the inside seal member. A suitable support member can be a post element disposed interior to the first conduit. Alternatively, a support member can include one or more post elements disposed exterior to the first conduit. A support member can also be a component of a positive stop mechanism to resist undesired fluid flow through the valve.

A post element can include an anchor disposed proximally from the outside seal member and adapted to maintain the valve in registration with a fluid supply conduit. One type of anchor includes a barb element. Another type of anchor can include a fitting adapted to index with a fluid supply tube. Certain of such fittings can change an angle of fluid flow from the fluid supply conduit.

These features, advantages, and alternative aspects of the present invention will be apparent to those skilled in the art from a consideration of the following detailed description taken in combination with the accompanying drawings.

BRIEF DESCRIPTION OF THE SEVERAL VIEWS OF THE DRAWINGS

In the drawings, which illustrate what is currently considered to be the best modes for carrying out the invention:

FIG. 1 is a view in perspective of a first prior art bite valve in a closed position.

FIG. 2 is a view in perspective of the valve illustrated in FIG. 1 in an open position.

FIG. 3 is an exploded view in perspective of a second prior art bite valve in a closed position.

FIG. 4 is a view in perspective of the valve illustrated in FIG. 3 in an assembled and open position.

FIG. 5 is a top view, partially in section, of a third prior art bite valve in a closed position.

FIG. 6 is a top view, partially in section, of the valve illustrated in FIG. 5 in an open position.

FIG. 7 is a side view in elevation of a core member of the valve illustrated in FIGS. 5 and 6.

FIG. 8 is an end view of the embodiment illustrated in FIG. 7, taken from section line 8—8 and looking in the direction of the arrows.

FIG. 9 is a view in elevation, and in section, of a first embodiment of the invention.

FIG. 10 is a close-up view of a portion of the embodiment of FIG. 9 with the valve being in a sealed configuration to resist fluid flow.

FIG. 11 is a similar view to FIG. 10, but with the valve being in an open configuration to permit fluid flow.

FIG. 12 is an end view of the embodiment illustrated in FIG. 11, taken through section 12—12 and looking in the direction of the arrows.

FIG. 13 is a similar view to FIG. 12, but illustrating a second valve embodiment.

FIG. 14 is a midplane view in section of an alternative valve embodiment.

FIG. 15 is a midplane view in section of another alternative valve embodiment.

DETAILED DESCRIPTION OF THE INVENTION

Figure 18:
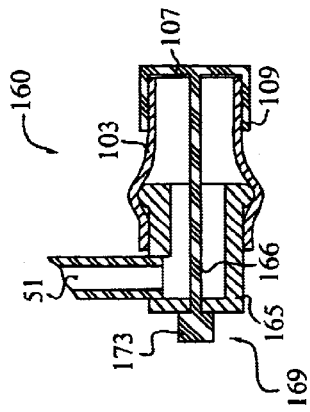
FIG. 18 is a view in section of the embodiment of FIG. 16, with the positive stop in a closed and locked position.

Reference will now be made to the drawings in which the various elements of the invention will be given numerical designations and in which the invention will be discussed so as to enable one skilled in the art to make and use the invention. It is to be understood that the following description is only exemplary of the principles of the present invention, and should not be viewed as narrowing the claims which follow.

FIGS. 1 and 2 illustrate a prior art CamelBak™ bite valve, generally indicated at 50, in closed and open positions, respectively. A fluid delivery conduit 51 is attached at a proximal end of valve body 53. A distal end of body 53 carries a slit 55. Slit 55 is self-biased to a closed position, as illustrated in FIG. 1. Hollow body 53 is typically made from a soft, easily deformable, rubber-like material. Transversely squeezing body 53, as illustrated in FIG. 2, forms an opening 57 in slit 55 through which fluid may flow. As the resilience of the material operable to maintain slit 55 in a closed position diminishes, the slit may lose its sealing capability and begin to leak. A valve with diminished resilience may even leak under the influence of gravity. In such case, a replacement valve must be installed.

FIGS. 3 and 4 illustrate a prior art Platypus bite valve, generally indicated at 60, in closed and open positions, respectively. Again, a fluid delivery conduit 51 is attached at a proximal end of valve body 63. A seal member 64 carries a slit 65 for disposition at a distal end of body 63. Slit 65 is disposed on a concave membrane surface, and is adapted to open inward towards the interior of body 63 and form opening 67. Slit 65 is self-biased to a closed position, as illustrated in FIG. 3. The concave membrane can function additionally to help bias the slit 65 closed under internal fluid pressure, up to a threshold pressure at which fluid will either leak through slit 65, or seal member 64 will be flushed from its installed location at a distal end of body 63.

The Wolfe Tory valve, generally indicated at 70, is illustrated in FIGS. 5 and 6, with additional component and functional details being illustrated in FIGS. 7 and 8. As with the two prior mentioned valves, a fluid delivery conduit 51 may be attached to a proximal end of body 73 to supply fluid from a remote storage location. Rigid core member 74 is sized to form a self-biased seal with body 73 to prevent fluid flow through chambers 75 (FIGS. 7–8). Core member 74 may be fixed in position relative to a conduit 51 by anchors 76. Squashing body 73 (in a direction into the page for FIGS. 5 and 6), deforms body 73 transversely, as illustrated by arrow T in FIG. 6. Continuing to refer to FIG. 6, the squashed body 73 permits fluid flow, represented by arrows 78, into chambers 75, and subsequently exiting the valve 70 through opening 79 at a distal end of body 73.

The three prior art valves each require a user to bite their respective bodies in a certain orientation to open the valves for fluid flow. In the case of slit valves, such as the CamelBak™ and Platypus valves, a user must bite substantially parallel to the slit direction. It should be readily apparent that biting perpendicular to a slit simply provides additional pressure to maintain the slit closed. The Wolfe Tory valve is similar, in that biting the valve in FIG. 5 parallel to the page simply presses body 73 into tighter engagement with chambers 75, thereby further resisting fluid flow through the valve.

The three prior art valves described above also share certain other valve characteristics. Each prior art valve is configured to have an element being self-biased into sealing engagement with a seal surface. Additionally, such self-bias is directed to counter any pressure existing in the fluid supply conduit, upstream of the valve orifice. Therefore, as the self-bias is reduced, for example due to material fatigue or simply a reduction in elasticity over time, the effectiveness of the valve seal may be compromised. Even in a new valve, fluid upstream of the valve orifice may be pressurized to a threshold value at which the self-bias is overcome, permitting the valve to leak.

Some definitions will promote an understanding of the specification, and assist in an interpretation of the claims which follow. A delivered fluid axis may be defined as a vector directed to enter the mouth of a user of a bite valve. At some location in such a valve, fluid flow will be substantially aligned with such a delivered fluid axis. Inside and outside may be used with respect to directions in and out of a valve or component, and, similar to the terms interior and exterior, are substantially self-explanatory. A localized portion is meant to describe an adjacent and effected part of a body due to application of a force or displacement. Transverse is used as a direction similar to radial with respect to a centerline or axis of a cross-section. Transverse may be approximately perpendicular to a direction of fluid flow at the location under discussion. Flexible is used to characterize a material capable of deforming sufficiently to permit formation of a flow path; also deforming to provide comfort in biting a valve or a "comfortable mouth feel". Distal and proximal are relative terms applied to structure such that distal is downstream of a fluid source, and proximal is upstream of the distal part. That is, relative to fluid flow toward a distal direction. Finally, a bayonet mechanism describes components being pressed along an axis into piercing engagement, with one component subsequently rotated with respect to the other, whereby to form a structural interference fit maintaining the engagement between components.

One in-line bite valve embodiment, generally indicated at 100, of the invention will now be described with reference to FIG. 9. Embodiment 100 is in-line, in that valve 100 has a body 103 disposed for fluid delivery substantially as a continuation of fluid delivery conduit 51. Valve body 103 is formed as a flexible first conduit having an exterior surface at an end, generally indicated at 105, being self-biased into engagement with a seal surface carried by cap 107. Cap 107 may be regarded as a seal member. Cap 107 carries a flange element 109 protruding proximally to form a second conduit. An inside perimeter surface of element 109 may function as a seal surface against which an exterior surface at end 105 of body 103 may be registered in self-biased, sealing engagement. A cap 107 may be held in a functional position relative to body 103 by a support member, such as post 111. As illustrated in FIG. 9, post 111 maybe affixed to a fluid supply conduit by anchor structure 115. Anchor structure 115 may include barb elements 116 to promote an interference fit with a surface, such as an interior surface of conduit 51.

Although illustrated in FIG. 9 as a contiguous and unitary component, seal member 107 may be a separate element from a post 111. Similarly, an anchor 115 may be a separate element from a post element 111. Such separate elements may be bonded, or somehow attached, together to form a supported seal member assembly. Of course, all constituent elements forming a bite valve according to the invention may have different configurations than those illustrated in the FIGURES. of this disclosure. Manufacturing considerations may help determine the conformation of the elements forming a bite valve according to the instant invention. Such considerations non-exclusively include: moldability, labor costs, complexity, reliability, and structural integrity of the final assembly. It is usually considered desirable to minimize the number of components in a valve to decrease assembly labor costs. A very complex mold may reduce the number of required components to form a valve. However, the cost associated with a complex mold must be balanced against the savings in labor, or other benefits, achieved by the molded part.

The principals of operation of a valve according to the instant invention are illustrated in FIGS. 10 and 11. FIG. 10 illustrates a valve seal area of a valve in a closed configuration. FIG. 11 illustrates the valve seal area of a valve in an open, or fluid flow, configuration. In FIG. 10, it maybe appreciated that exterior surface 117 of body 103 is in a self-biased engagement with an interior perimeter surface 119 of cap 107. It is within contemplation for inside perimeter surface 119 alternatively to carry an inward protruding structure with which cooperatively to form a seal with surface 117.

In FIG. 11, the valve body 103 is illustrated as being transversely deformed by a user's teeth, generally indicated at arrow T. Therefore, a localized portion of conduit end 105 separates from contact with a corresponding engaged portion of cap 107, forming an opening 123, through which fluid may flow. Such fluid flow is represented by arrow F. From an understanding of FIG. 11, it can be visualized that in a symmetrically displaced valve body 103, such as typically occurs by biting body 103 between a user's top and bottom teeth, an opening 123 will be formed on each of opposite sides of valve body 103. It should be noted that a fluid flow path is present even if the body 103 is pressed into engagement with a top and bottom of post 111, as illustrated in FIG. 11, because an open channel still exists above and below the plane of the paper, on both sides of the post 111. In fact, a post 111 can be structured to serve as a bite stop structure to balance a fluid flow cross-section area at the bite location with openings 123 at the valve exit.

Body 103 desirably is made from a material having more flexibility, or being "softer" and more deformable, or extensible, than a seal member 107. Such an arrangement dictates that any fluid pressure in valve chamber 120 will augment the contact pressure between surfaces 117 and 119 in FIG. 10, thereby increasing the fluid retaining ability of the valve. It is currently preferred to form body 103 from sections of extruded silicone. Seal members may be injection molded from material suitable for use in a bite valve. Polycarbonate is one workable material, although a softer material may be desirable to provide a more comfortable "mouth feel". Other materials which may be used nonexclusively include rubber, nylon, urethane, polyethylene, and polypropylene.

As illustrated in FIG. 9, body 103 and cap 107 are substantially circular in cross-section, although such is not a requirement of the invention. A circular valve body cross-section provides the advantage of an valve having the same mouth feel, and which can be actuated regardless of valve body rotation about a fluid delivery axis. A valve, such as valve 100, may be circular in cross-section, ovalized, or have a shape otherwise adapted to fit comfortably into a mouth. Valves constructed according to principals of the invention and having ovalized, or other shaped, bodies also can be actuated independent of body rotation about a delivered fluid axis. However, a body having an ovalized, or elongated, shape produces a preferred orientation in a mouth.

The invention can be embodied as a valve having improved volumetric flow capability over previously available bite valves. Valves constructed according to principals of the invention may offer an increased fluid flow area through a combination of valve orifices, or openings 123. FIG. 12 illustrates the embodiment 100 having two fluid exit ports 123, each of which maybe substantially equivalent in opening size to valve exit ports 57 or 67 in FIGS. 2 and 4.

The embodiment 130 illustrated in FIG. 13 further increases the potential combined open area of ports 123 by relocating a support member (corresponding to post 111 in FIG. 12) for cap 107 to a location external to the valve. The cross-section area formerly occupied by post 111 is therefore made available to support fluid flow. The relocated support may be embodied as a pair of support posts 132, as illustrated in FIG. 13.

Posts 132 may have alternative cross-sections to those illustrated in FIG. 13. For example, cap support members 132 can be embodied having a length to provide a bite displacement stop to assist in equalizing an internal flow cross-section area through squashed conduit portion 134 to the combined flow cross-section area of ports 123. Equalizing the flow area through section 134 to the flow area of combined ports 123 can optimize fluid throughput of a valve. Since the fluid is in an area of flow redirection near the exit of a bite valve according to the invention, an increased flow area, over the cross-section area in the fluid supply conduit, is desired. (A lesser cross-section area in the fluid supply conduit is not necessarily the flow choke). Of course the embodiment 130, illustrated in FIG. 13, will have a preferential alignment orientation in a mouth for bite operation due to the illustrated externally paired post members 132.

Sometimes, for ergonomic or other reasons, it is preferred to form a bite valve as an angle valve. The present invention can be embodied as angled valves, such as illustrated in FIGS. 14 and 15. The embodiment of FIG. 14, generally indicated at 140, has an angle fitting 145 to change a direction of fluid flow from fluid supply conduit 51 to a preferred direction through a valve assembly 140. Fitting 145 has a barbed end 147 for insertion into a distal end of conduit 51. A similar angle valve embodiment, generally indicated at 150 in FIG. 15, has a fitting 155. Angle fitting 155 receives a distal end of conduit 51 in a bonded or friction fit relation inside port 157. The angle fittings 145, 155 are illustrated as forming substantially 90 degree changes in fluid flow, although any acute or obtuse angle is workable. Of course, commonly available plumbing angle fittings may be installed upstream of a valve similar to in-line embodiment 100 to accomplish a similar change in fluid delivery angle. A flexible body 103 may even be manufactured directly to incorporate such an angle change along its length.

In certain situations, a mechanism to provide a positive stop, or shut-off of fluid flow, is desired in a bite valve arrangement of a personal hydration unit. Such a situation may occur during storage of the fluid reservoir between uses, or when transporting the unit between sites where it may be used, or when the portable hydration system might be subject to large internal fluid pressures, such as might occur when dropped from a supply helicopter to awaiting troops. In such circumstances, prevention of valve leakage is desirable.

Figure 17:
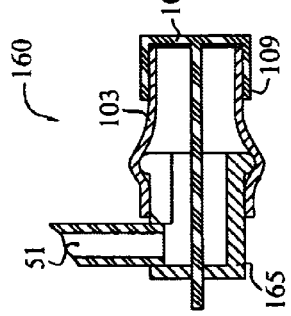
FIG. 17 is a view in section of the embodiment of FIG. 16, now showing the positive stop in a closed position.
Figure 16:
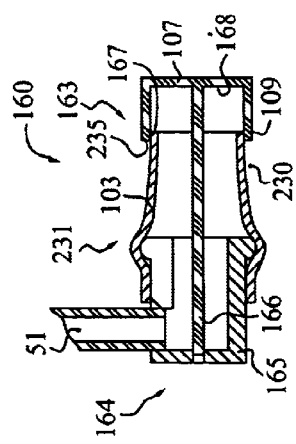
FIG. 16 is a midplane view in section of an additional alternative valve embodiment having a positive stop in an open position.

The invention may also be embodied to include a positive stop mechanism to resist a fluid discharge through the valve. One such valve is illustrated in FIGS. 16–18 and generally indicated at 160. In FIG. 16, embodiment 160 is shown in a sealed valve configuration, but with the positive stop mechanism, generally indicated at 163, deployed for bite actuation of the valve. It is recognized that sealing structure would normally be present at end 164, between fitting 165 and post 166. Such sealing structure is not illustrated to maintain simplicity and clarity of operation of the embodiment depicted in the FIGS. 16–18. Also, a travel limiting restraint to prevent additional distal translation of stem 166 substantially from its illustrated location is not shown, although such a restraint limit normally is present in a bite valve 160.

In FIG. 17, embodiment 160 is illustrated being in a positive fluid stop configuration. Cap 107 is moved proximally to resist fluid flow through body 103 by placing distal end 167 in contact with surface 168. As illustrated, the conduit formed by leg 109 may be in such close proximity to a distal end of fitting 165 that the body 103 is effectively shielded from a transverse displacement actuator. For example, a user's teeth may not fit between a proximal end of flange 109 and a distal end of fitting 165. Therefore, body 103 cannot effectively be displaced to open a path through the valve 160. Even if a portion of body 103 were transversely displaced, the distal end of the body 103 still would remain occluded by an interior surface 168 of cap 107.

A flexible conduit may be displaced, at a location away from its end, without causing a corresponding translation of such end. This "hour-glass" effect is shown, to a limited extent, in FIGS. 12 and 13, where a distal end 167 of body 103 is closer to seal surface 119 than the proximally located and transversely displaced cross-section. Therefore, one effective positive stop mechanism operable in the instant invention is simply to cover that portion of a distal end of a body 103 required sufficiently to prevent a transverse displacement of an uncovered portion of body 103 from entirely separating a covered distal end portion from contact with an inner perimeter surface of cap 107.

For example, a cap 107 may be slid proximally effectively to move an actuation location of a user's teeth proximally from the distal end of a body 103. Spacing of a user's teeth from a distal end of body 103 may be effected by a length of the conduit formed by flange 109. When the spacing of the user's teeth from a distal end of body 103 is sufficiently large, biting down on the body 103 will fail to displace its distal end from self-biased sealing engagement with the surface 119 (FIG. 10). Cap 107 may be sufficiently maintained in the proximal, positive stop, position by friction or an interference between valve members or components.

A positive lock may be incorporated in a positive stop mechanism to resist disengagement of the positive fluid stop feature. One embodiment of a positive lock is a bayonet lock, generally indicated at 169, in FIG. 18. Tab 173 can be oriented out of registration with its receiving bore in fitting 165 to resist a distal displacement of post 166. The illustrated mis-registration of tab 173 depicted in FIG. 18 can be accomplished by rotating cap 107 approximately 90 degrees from the position illustrated in FIG. 17.

Figure 20:
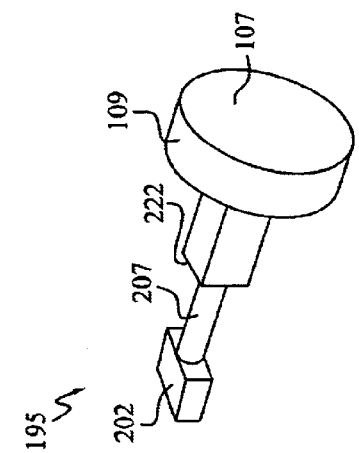
FIG. 20 is a view in perspective of a valve seal portion and stem to receive the anchor of FIG. 19.
Figure 19:
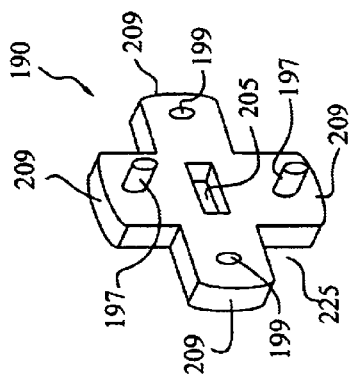
FIG. 19 is a view in perspective of an anchor component of another alternative valve embodiment.

A second positive lock may be formed by a combination of structure illustrated in FIGS. 19 and 20. A pair of anchor structure elements, generally indicated at 190, in FIG. 19 may be installed onto a post element, generally indicated at 195, in FIG. 20. An anchor element may include a pair of prongs 197, and holes 199. During assembly, a first anchor element 190 (the front anchor) can be installed with tab 202 being inserted through slot 205. The prongs 197 would be protruding proximally for reception in holes 199 of a second anchor element 190 (the rear anchor). Therefore the front and rear anchor elements can be installed in a snap fit being "clocked" 90 degrees from one another, and may rotate together about shaft section 207. Once assembled, the anchor assembly cannot be removed from post 195 accidentally.

A positive stop mechanism formed from anchors 190, post 195, and cap 107 can form a valve by forcing ends 209 into interference fit inside a fluid supply conduit 51, or into a body 103. Ends 209 can be spaced apart to form an interference fit with the inner surface of a conduit 51 or a body 103. It is currently preferred that certain lengths of structures 190, 195, 109, and 107 cooperate for installation and function of a positive stop mechanism. For example, surface 222 can be adapted to press on front anchor 190 until the anchor assembly is in an installed position to create a stop mechanism, at which point a distal end of body 103 contacts an inside proximal surface of cap 107. At this position, tab 202 may form a positive lock by being out of registration with slot 205 in the rear anchor 190. Tab 202 may then be aligned with slot 205 in rear anchor 190, and cap 107 moved distally to effect a separation of end 167 (FIG. 16) from surface 168. Distal movement of cap 107 desirably will be stopped by contact of tab 202 with the front anchor 190 when the valve is in a configuration for normal fluid dispensing operation. Fluid can flow past an anchor assembly through spaces 225 between anchor structure. An advantage of the immediately above described stop mechanism is the freedom from sealing structure between moving parts at the anchor area.

Figure 21:
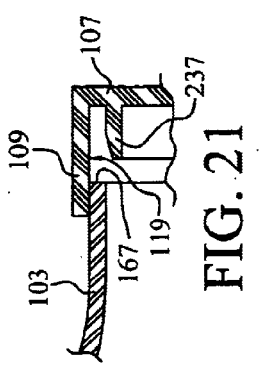
FIG. 21 is a view in section of a portion of a bite valve having an alternative positive stop in an open position.
Figure 22:
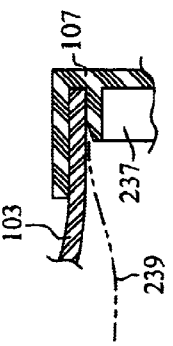
FIG. 22 is a view in section of the embodiment illustrated in FIG. 21, having the positive stop in a closed position to prevent a valve seal from opening.

FIGS. 21 and 22 depict an optional configuration of a cap 107 to assist in forming a positive fluid stop. A leg 237, offset from leg 109 inside cap 107, forms a conduit sized for insertion into end 167 of body 103. When the valve is placed into a positive stop position, as illustrated in FIG. 22, body 103 is supported by leg 237 to maintain a seal with surface 119. The seal is therefore maintained even if body 103 is transversely displaced (as indicated by phantom line 239).

It is currently preferred to make a distal mouth end of the valve configured for automatic alignment of a user's teeth with a preferred area 230 (FIG. 16), or location for valve transverse activation. Transverse actuation is best effected near the distal end 167 of a flexible conduit 103 to best separate cooperating seal areas. For example, in FIG. 16, an enlarged diameter, generally indicated at 231, may be formed proximal to the desired tooth engagement zone 230. Such a structure may define a first boundary. A proximal lip 235 forms a second boundary. The valve may be so structured that a user's teeth naturally, or preferentially, engage between the first and second boundaries.

An elongated body 103 may have a length sufficient to extend proximally to function as a fluid supply conduit to a fluid reservoir at a remote location. It is also within contemplation that a flexible body 103 may be substantially short, having only sufficient length to be operable between a sealed valve configuration and an open valve configuration. One embodiment of the latter type has a body 103 disposed between an end fitting and a sealing member 107. Another embodiment of the latter configuration provides a fluid reservoir in close proximity (adjacent) to a bite valve. Of course, the length of body 103 may fall somewhere between such long and short extremes.

Figure 23:
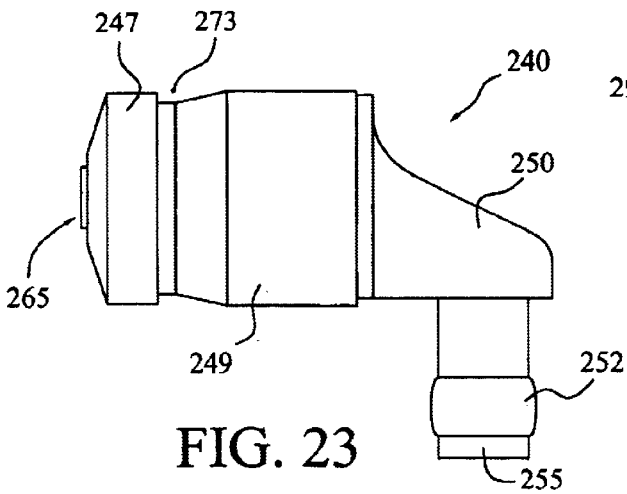
FIG. 23 is a side view of a currently preferred embodiment of a bite valve providing an approximately 90 degree angle between a fluid supply conduit and a user's mouth.
Figure 24:
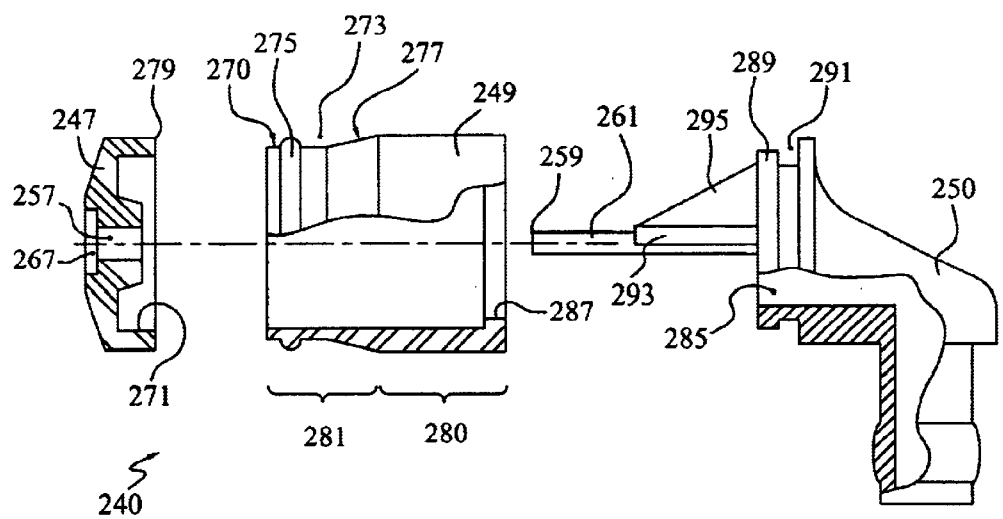
FIG. 24 is an exploded side view, partially in section, of the embodiment illustrated in FIG. 23.

FIGS. 23 and 24 illustrate a currently preferred embodiment of a bite valve, generally indicated at 240. Bite valve 240 includes a cap 247, a valve body 249 and an angle fitting 250. Angle fitting 250 may include a seal structure 252 for coupling a fluid supply conduit (not illustrated) to proximal end 255 in a fluid-tight engagement. The conformation of seal structure 252 can be any shape suitable to maintain fitting 250 in engagement with a fluid supply conduit, and to resist leaking of fluid at the connection location. While fitting 250 is illustrated as providing an approximately 90 degree change in orientation between a fluid supply conduit and entry to a user's mouth, acute and obtuse angles are also workable.

With reference now to FIG. 24, certain details of the currently preferred embodiment 240 may further be described. A cap 247 typically has a central through-bore 257, sized sealingly to receive a tip end 259 of post 261. A cap 247 may be attached to a post 261 by heat-staking tip end 259 to form a button 265 (FIG. 23) which may be received, at least in part, in an enlarged bore 267. Other attachment methods are within contemplation, including spin welding, use of adhesives, or simply through an interference fit.

While not necessarily a feature of the currently preferred embodiment 240, a positive stop, configured substantially to prevent fluid flow through the valve 240, may additionally be provided in certain valves. One way to arrange such a positive stop is for cap 247 to be slidable proximally on post 261 to bring a distal end of body 249 into contact with a corresponding surface in cap 247. A button 265 would form a distal stop, against which a user can pull cap 247 with his teeth or fingers to release the positive stop feature. In any event, it is generally desired that a cap 247 not be separable from engagement with structure of a valve 240.

Valve body 249 is assembled in trapped engagement between cap 247 and angle fitting 250. Distal exterior surface 270 of body 249 is sized larger in diameter than interior cap surface 271 to create a self-biased interface and form a fluid seal on assembly of the valve 240. A preferred tooth engagement zone 273 is created between a distal boundary, (e.g. formed by ring 275), and a proximal boundary, (e.g. formed by ramp 277). Ring 275 is sized to guide a user's teeth about 0.010 inches, or so, in a proximal direction, away from end 279 of cap 247. The spacing of a user's teeth from the end 279 facilitates fluid flow through the valve 240. Without providing a space from end 279, certain users, having an appropriate tooth conformation, can sufficiently occlude an opening 123 (FIGS. 12 and 13) to reduce fluid flow.

To accomplish a high fluid flow rate, it may be desirable to resist formation of a hour-glass shape in body 249 when actuating the valve 249. As previously described, such an hour-glass shape may prevent the seal, formed between a distal end of a valve body and a cap, from opening. In fact, an hour-glass configuration may be maintained in a body by positive shut-off structure, such as illustrated in FIG. 22. However, in valve 249, a sealing hour-glass shape in body 249 is not desired. To ensure opening of a path 123 is commensurate with displacement by a user's teeth, tooth engagement zone 273 is located in close proximity to seal surface 270, to ensure that both structures will have similar deflections. Furthermore, both seal surface 270 and tooth zone 273 are located in proximity to a distal end of body 247. Additionally, proximal portion 280 of body 249 maybe formed having a greater thickness than distal portion 281. Such arrangement of thicknesses tends preferentially to deflect the distal portion 281.

Figure 25:
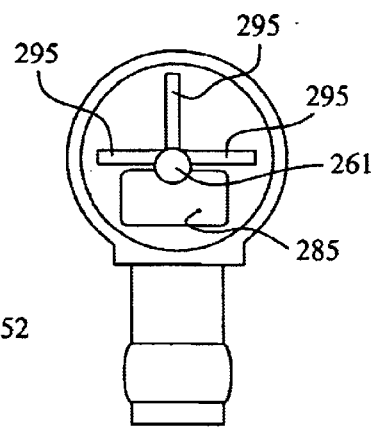
FIG. 25 is a end view looking at the discharge end of the angle fitting of the embodiment illustrated in FIGS. 23 and 24.

Referring now to FIGS. 24 and 25, an angle fitting 250 provides a fluid flow conduit 285 configured to change the direction of flow from a fluid supply conduit 51 (not illustrated, but attachable at end 255). A proximal lip 287 of body 249 may be installed in fluid sealing relation over retaining rim 289. In the illustrated embodiment, lip 287 is received in groove 291. Post 261, provided to engage cap 247, may be supported by one or more brace elements, such as horizontal braces 293 and vertical brace 295. Of course, brace elements, if present, may be oriented at angles other than simply horizontal and vertical.

It is currently preferred to manufacture a cap 247 from a material providing a compliant feel in a user's mouth. Additionally, the cap 247 desirably is made from a material that is more resistant to deformation than a body 247, whereby to create a pressure augmented fluid seal. Suitable materials include polyurethane having a durometer rating between about 90-A to 75-B, or so. A currently preferred material for a cap 247 is an ultra low density polyethylene, such as metalocene polyethylene. A body 249 desirably is flexible and resilient to form a self-biased seal to a cap 247. Silicone rubber in a range of perhaps 40-D to about 70-D is workable. It is desired for a body 249 to have sufficient resistance to transverse deflection to rest in engagement between a user's teeth without opening the valve 240. Naturally, the wall thickness and material composition of body 249 work in harmony to accomplish such behavior. It is currently preferred to make an angle fitting 250 from a high density polyethylene to create a suitable valve foundation.

While the invention has been described in particular with reference to certain illustrated embodiments, such is not intended to limit the scope of the invention. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A valve operable to restrict fluid flow through a conduit, said valve comprising:

a valve seal member having an inside perimeter surface oriented to circumscribe an opening of said valve, and through which opening a fluid path exiting said valve exists; and a flexible conduit having an exterior surface at a first end adapted for a self-biased engagement with said perimeter surface to occlude said opening to resist fluid flow therethrough, wherein:

a transverse displacement of a localized portion of said exterior surface relative to a corresponding engaged portion of said perimeter surface opens said fluid path.

2. The valve of claim 1, wherein said seal member and a distal portion of said flexible conduit are sized to fit within a human mouth.

3. The valve of claim 1, wherein a portion of said valve is configured for disposition inside a human mouth to enable teeth therein to effect said transverse displacement.

4. The valve of claim 3, wherein said valve is adapted to effect a transverse displacement of said flexible conduit independent of valve rotation, about a delivered fluid axis, in the human mouth.

5. The valve of claim 3, further comprising a positive stop mechanism operable to resist fluid discharge through said valve opening.

6. The valve of claim 5, wherein said positive stop mechanism comprises a bayonet lock mechanism.

7. The valve of claim 5, said positive stop mechanism comprising a sliding mechanism adapted to bring an end of said flexible conduit into engagement with an end seal.

8. The valve of claim 1, wherein: an increase in fluid pressure in said conduit causes a corresponding increase in contact pressure between said exterior surface and said inside perimeter surface in a sealed valve, thereby further resisting fluid flow through said valve.

9. A bite valve of the type to regulate fluid delivery to a human mouth, the improvement comprising:

an inside seal member comprising a first flexible portion configured in self-biased harmony with an outside seal member such that a localized transverse displacement, directed inwardly, of said first flexible portion opens a fluid flow path through an opening formed, as a result of separation of contact between said inside and outside seal members, by said transverse displacement.

10. The bite valve of claim 9, wherein said fluid flow path is formed by a transversely inward deflection of said first flexible portion with respect to said outside seal member.

11. The bite valve of claim 9, wherein said outside seal member comprises a second flexible portion.

12. The bite valve of claim 9, in combination with a fluid delivery conduit in fluid communication with a proximal end of said bite valve.

13. The bite valve of claim 12, wherein an increase in fluid pressure in said fluid delivery conduit causes a corresponding increase in contact pressure between said outside seal member and said inside seal member in a sealed valve, thereby further to resist fluid flow through said bite valve.

14. The bite valve of claim 9, wherein said bite valve is configured to permit a transverse displacement of said first flexible portion independent of valve rotation, about a delivered fluid axis, in the human mouth.

15. The bite valve of claim 9, further comprising a positive stop mechanism operable to resist fluid discharge through said opening.

16. The valve of claim 15, wherein said positive stop mechanism is configured to occlude an end opening of said inside seal member.

17. A valve comprising:

an inside seal member comprising a transversely flexible first conduit for guiding fluid from a first end to a second end, and having a first seal surface located at an exterior perimeter of said second end;

an outside seal member configured and arranged as a cap to block distally directed fluid flow exiting said second end of said first conduit, and having a proximally directed flange forming a second conduit having an inside surface comprising a second seal surface, said first seal surface being self-biased for engagement with said second seal surface to form a fluid seal to resist fluid flow therepast; and a support member adapted to locate said outside seal member in a functional position relative to said inside seal member, wherein:

a radially inward displacement, of a localized portion of said first seal surface relative to a corresponding portion of said second seal surface, opens a fluid path through said valve.

18. The valve of claim 17, wherein said support member comprises a post element disposed interior to said first conduit.

19. The valve of claim 18, wherein said post element comprises an anchor disposed proximally from said outside seal member and adapted to maintain and valve in registration with a fluid supply conduit.

20. The valve of claim 19, wherein said anchor comprises a barb element.

21. The valve of claim 19, wherein said anchor comprises a fitting adapted to change an angle of fluid flow from said fluid supply conduit.

22. The valve of claim 17, wherein said support member comprises a post element disposed exterior to said first conduit.

23. The valve of claim 17, wherein said displacement is operable to open said fluid path through said valve independent of valve rotation about a fluid delivery axis in a human mouth.

24. The valve of claim 17, further comprising a positive stop mechanism to resist undesired fluid flow through said valve.

25. The valve of claim 24, wherein said positive stop mechanism is configured to occlude an opening at said second end of said first conduit.

* * * * *